United States Patent
Byeon et al.

(10) Patent No.: US 7,710,500 B2
(45) Date of Patent: May 4, 2010

(54) VIDEO PROCESSING APPARATUS AND METHODS USING SELECTIVELY MODIFIED SYNC POSITIONS

(75) Inventors: Heo-jin Byeon, Gyeonggi-do (KR); Kyung-mook Lim, Gyeonggi-do (KR); Hyung-jun Lim, Gyeonggi-do (KR); Jae-hong Park, Gyeonggi-do (KR); Sung-cheol Park, Seoul (KR); Eui-jin Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1169 days.

(21) Appl. No.: 11/312,173

(22) Filed: Dec. 20, 2005

(65) Prior Publication Data
US 2006/0152625 A1 Jul. 13, 2006

(30) Foreign Application Priority Data
Dec. 20, 2004 (KR) .................. 2004-0108824

(51) Int. Cl.
*H04N 5/06* (2006.01)
*H04N 5/08* (2006.01)
*H04N 9/77* (2006.01)

(52) U.S. Cl. .................. 348/521; 348/525; 348/663

(58) Field of Classification Search .................. 348/521, 348/500, 525–527, 529–531, 533, 540, 663–670; *H04N 5/06, 9/45, 9/455, 5/04, 9/44, 5/08, H04N 5/10, 9/77, 9/78*
See application file for complete search history.

(56) References Cited

U.S. PATENT DOCUMENTS

| | | | | | |
|---|---|---|---|---|---|
| 2,962,549 | A | * | 11/1960 | Fricks | ............... 358/410 |
| 6,008,859 | A | * | 12/1999 | Ito et al. | .............. 348/540 |
| 6,295,360 | B1 | * | 9/2001 | Ryan et al. | ............. 348/663 |

FOREIGN PATENT DOCUMENTS

| | | |
|---|---|---|
| JP | 2004-048614 | 2/2004 |
| KR | U1993-0008692 | 12/1993 |
| KR | 1020000004450 A | 1/2000 |
| KR | 20010068851 A | 7/2001 |
| KR | 1020020088773 A | 11/2002 |
| TW | 295767 | 1/1997 |

OTHER PUBLICATIONS

Preliminary Notice of the First Office Action, Taiwan Patent Application No. 094145214, Mar. 19, 2008.
Notice to Submit Response, Korean Application No. 10-2004-0108824, Jun. 28, 2006.

* cited by examiner

*Primary Examiner*—Sherrie Hsia
(74) *Attorney, Agent, or Firm*—Myers Bigel Sibley & Sajovec, P.A.

(57) ABSTRACT

Sync positions are detected from a video signal. The detected sync positions are processed (e.g., averaged) to generate modified sync positions. The detected sync positions and the modified sync positions are selectively used to sample and synchronize a color signal derived from the video signal. For example, the detected sync positions and the modified sync positions may be selectively used to sample and synchronize the color signal responsive to differences between the modified sync positions. The invention may be embodied as apparatus and/or methods.

21 Claims, 6 Drawing Sheets

VIDEO PROCESSING APPARATUS AND METHODS USING SELECTIVELY MODIFIED SYNC POSITIONS

RELATED APPLICATION

This application claims the benefit of Korean Patent Application No. 10-2004-0108824, filed on Dec. 20, 2004, in the Korean Intellectual Property Office, the disclosure of which is incorporated herein in its entirety by reference.

BACKGROUND OF THE INVENTION

The present invention relates to video signal processing apparatus and methods and, more particularly, to apparatus and methods for synchronizing a video signal.

A video processing system, such as a video decoder, may include apparatus configured to perform a 3D luminance/chrominance (Y/C) separation of an input video signal. FIG. 1 is a block diagram illustrating a conventional video signal processing apparatus 100 for performing a 3D Y/C separation. Referring to FIG. 1, the video signal processing apparatus 100 includes an analog/digital (A/D) converter 110, a Y/C separator and demodulator 120, a sync detector 130, a field/frame memory 140, and a re-sampler 150.

The A/D converter 110 converts an input analog video signal into a digital video signal. The input analog video signal may be a composite video blank sync (CVBS) signal including a front porch signal, a horizontal sync level signal, a back porch signal, and an active video signal. The sync detector 130 detects a horizontal sync position and a vertical sync position used to define horizontal and vertical scan periods from the converted digital video signal. The field/frame memory 140 stores the detected horizontal sync positions $\{p_i\}$ for a plurality of fields or frames. The Y/C separator and demodulator 120 performs a 3D Y/C separation according to the detected horizontal sync positions $\{p_i\}$ stored in the field/frame memory 140, extracts a luminance signal Y and a chrominance signal C from the converted digital video signal, interpolates the luminance signal Y and the chrominance signal C, and generates color signals, such as R, G, B color signals (R, G, B) or luminance (Y) and chrominance component (Cb, Cr) signals used by a display device (e.g., a liquid crystal display (LCD)). The color signals generated in the Y/C separator and demodulator 120 are re-sampled in the re-sampler 150 according to the horizontal sync positions $\{p_i\}$. The re-sampled color signals may be used to generate a display on a display device.

When a video cassette recorder (VCR) outputs a CVBS signal, mechanical factors may cause jitter among horizontal sync positions extracted from the CVBS signal. When a TV or a digital video disk (DVD) system outputs a CVBS signal, less jitter may occur. Noise in the CVBS signal may deteriorate accuracy of the horizontal sync positions detected from the sync detector 130. Referring to FIG. 2, when the re-sampler 150 re-samples the color signals generated in the Y/C separator and demodulator 120, the screen 210 may display an unstable image due to errors in the horizontal sync positions $\{p_i\}$. In particular, phase differences among the horizontal sync positions $\{p_i\}$ may be present, which may cause an unstable display.

SUMMARY OF THE INVENTION

Some embodiments of the present invention provide digital video signal processing apparatus that may generate a stable image by performing a 3D Y/C separation and sampling the Y/C separated color signals according to horizontal sync positions that are modified to reduce errors caused by noise. Some embodiments of the present invention also provide video signal processing methods using modified horizontal sync positions by fields or frames to reduce errors in horizontal sync position caused by noise.

In some embodiments of the present invention, an apparatus includes a sync position determiner configured to receive sync positions and to process (e.g., average) the received sync positions to generate modified sync positions. The apparatus further includes a sync position selector configured to selectively output the received sync positions and the modified sync positions.

In some embodiments, the sync position selector configured to selectively output the received sync positions and the modified sync positions responsive to differences between the modified sync positions. For example, the sync position selector may be configured to determine a minimum difference between the modified sync positions and a maximum difference between the modified sync positions and to select from the received sync positions and the modified sync positions based on the minimum and maximum differences. In further embodiments, the sync position determiner may be configured to generate a modified horizontal sync position $n_i$ according to the formula $$n_i = n_{i-1} + \frac{1}{2M+1} \sum_{j=i-M}^{i+M} (p_j - p_{j-1}),$$

wherein i is a horizontal sync position index and $p_j$ are received sync positions corresponding to, preceding and following the modified horizontal sync position $n_i$.

According to additional embodiments of the present invention, the sync position selector may be configured to select received horizontal sync positions if a difference between the minimum and maximum differences meets a predetermined criterion. The sync position selector may select modified horizontal sync positions if the difference between the minimum and maximum differences fails to meet the predetermined criterion.

In some embodiments of the present invention, a video signal processing apparatus includes a sync detector configured to detect sync positions from an input video signal and a memory configured to store the detected sync positions for one or more fields. The apparatus also includes a Y/C separator and demodulator configured to perform a Y/C separation and demodulation of the input video signal according to the detected horizontal sync positions to generate a color signal. The apparatus further includes a selective sync position generator configured to receive the detected sync positions from the memory, to process the received sync positions to generate modified horizontal sync positions, and to selectively output the received sync positions and the modified sync positions. The apparatus further includes a sampler configured to sample and synchronize the color signal according to the sync positions output by the selective sync position generator.

The selective sync position generator may selectively output the received sync positions and the modified sync positions responsive to differences between the modified horizontal sync positions. The input video signal may include a digital video signal, and the apparatus may further include an A/D converter configured to convert an analog video signal to produce the digital video signal. The selective sync position generator may be configured to provide modified sync positions to the sampler if the input video signal is a TV or DVD output signal, and the sync position selector may be configured to provide detected sync positions to the sampler if the input video signal is a VCR output signal.

In some method embodiments of the present invention, sync positions are detected from a video signal. The detected sync positions are processed (e.g., averaged) to generate modified sync positions. The detected sync positions and the modified sync positions are selectively used to sample and synchronize a color signal derived from the video signal. In some embodiments, the detected sync positions and the modified sync positions are selectively used to sample and synchronize the color signal responsive to differences between the modified sync positions.

In further method embodiments, the detected sync positions are stored in a memory configured to store detected sync positions for one or more fields. The input video signal is Y/C separated and demodulated according to the stored detected horizontal sync positions to generate the color signal. Processing the detected sync positions to generate modified sync positions includes processing the stored sync positions, and selectively using the detected sync positions and the modified sync positions to sample and synchronize a color signal derived from the video signal includes sampling and synchronizing the color signal according sync positions selected from the stored detected sync positions and the modified sync positions.

DETAILED DESCRIPTION OF EMBODIMENTS OF THE INVENTION

Figure 1:
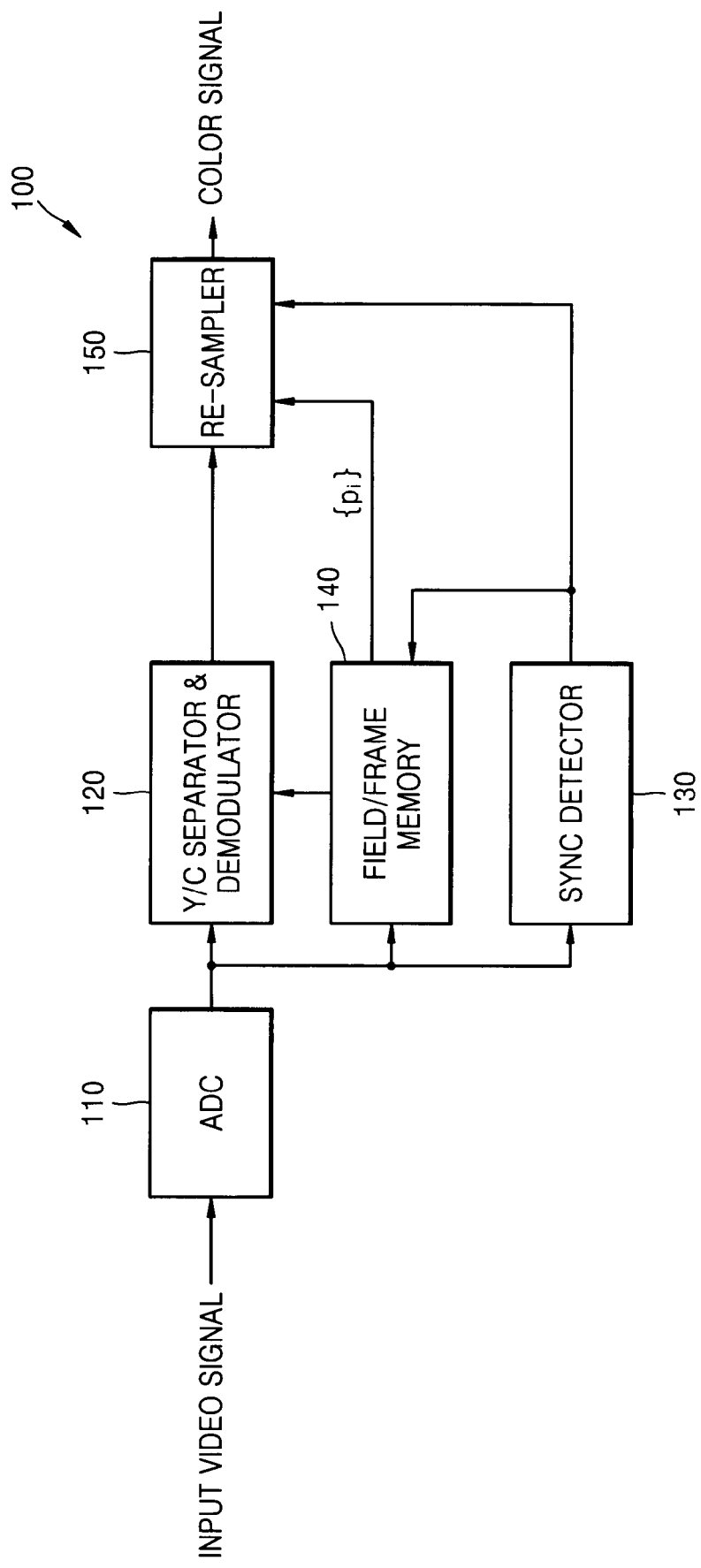
FIG. 1 is a block diagram illustrating a conventional video signal processing apparatus.
Figure 2:
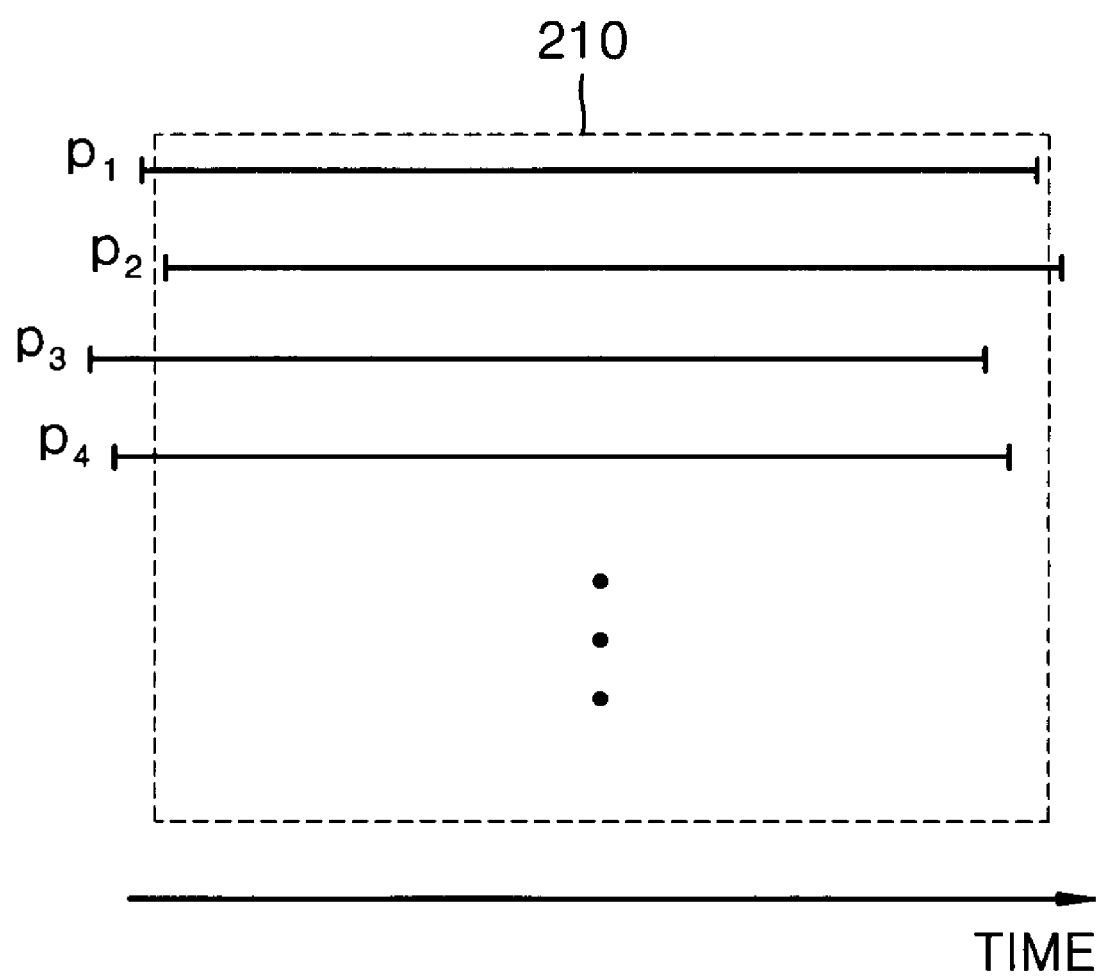
FIG. 2 illustrates horizontal sync errors that may occur in conventional video signal processing.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "includes," "including" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first item could be termed a second item, and similarly, a second item may be termed a first item without departing from the teachings of the present invention. As used herein, the term "and/or" includes any and all combinations of one or more of the associated listed items. The symbol "/" may also used as a shorthand notation for "and/or".

Figure 3:
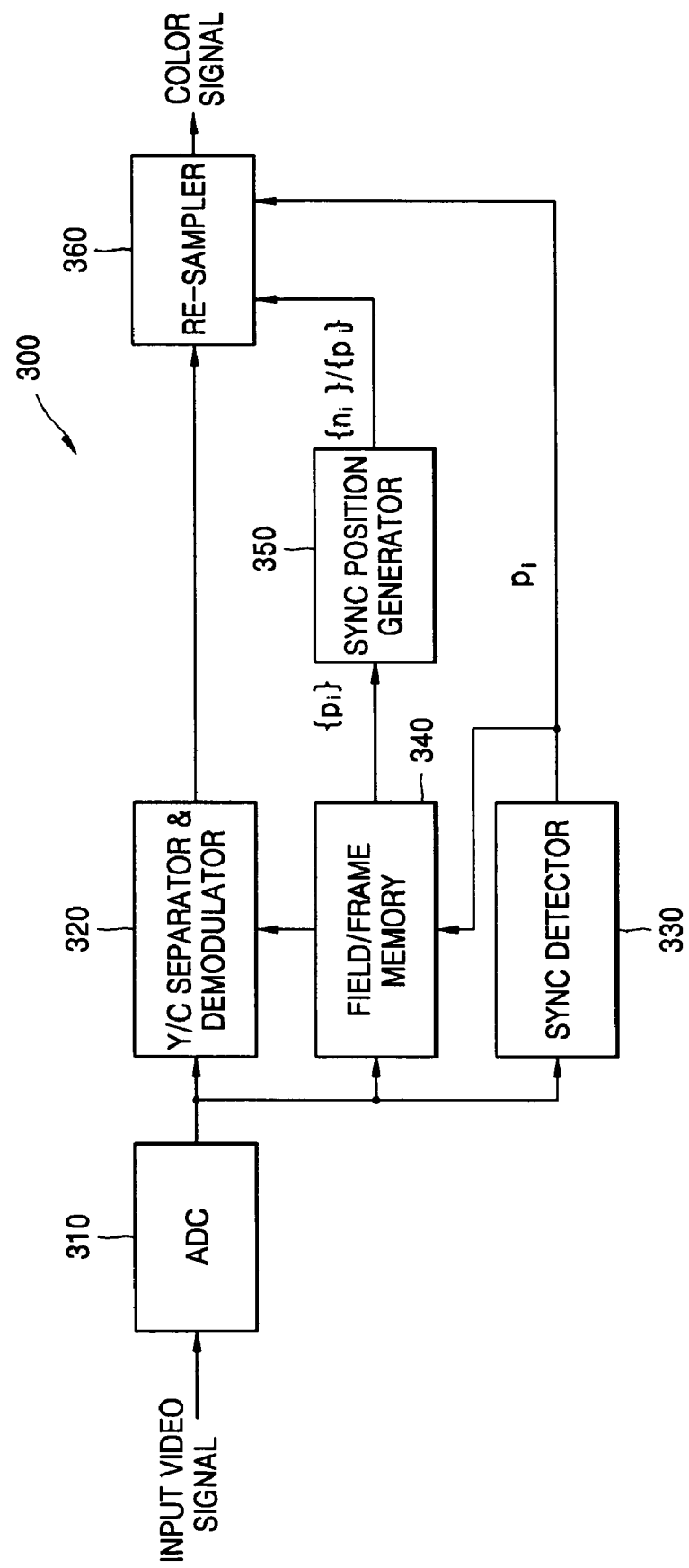
FIG. 3 is a block diagram illustrating a digital video signal processing apparatus according to some embodiments of the present invention.

FIG. 3 is a block diagram illustrating a digital video signal processing apparatus 300 according to some embodiments of the present invention. The digital video signal processing apparatus 300 includes an analog/digital (A/D) converter 310, a Y/C separator and demodulator 320, a sync detector 330, a field/frame memory 340, a selective sync position generator 350, and a re-sampler 360. The digital video signal processing apparatus 300 is configured to detect horizontal sync positions from an input analog video signal and to generate a stabilized image from resampled color signals according to horizontal sync positions $\{n_i\}$ or $\{p_i\}$ provided by the selective sync position generator 350. The input analog video signal may be a composite video blanking sync (CVBS) signal, which may include a front porch signal, a back porch signal, and an active video signal.

The A/D converter 310 converts the input analog video signal into a digital video signal and outputs the converted digital video signal to the Y/C separator and demodulator 320, the sync detector 330, and the field/frame memory 340. The sync detector 330 detects a horizontal sync position $p_i$ from the digital video signal during each horizontal scan period. The field/frame memory 340 stores detected horizontal sync positions for a plurality of fields (/frames) along with data of the digital video signal for the fields (/frames).

The Y/C separator and demodulator 320 perform a 3D Y/C separation based on horizontal sync positions for more than 3 fields (/frames) stored in the field/frame memory 340 and demodulates the separated signal. The Y/C separator and demodulator 320 extracts a luminance signal Y and a chrominance signal C from the digital video signal in the 3D Y/C separation process. The Y/C separator and demodulator 320 extracts the luminance signal Y and the chrominance signal C for display pixels of a current field based on horizontal sync positions corresponding to a previous field and a subsequent field and data of corresponding horizontal scan lines. The Y/C separator and demodulator 320 interpolates the luminance signal Y and the chrominance signal C and generates color signals, such as R, G, B color signals or a luminance signal Y and chrominance component signals (Cb, Cr), which may be used by a display device, such as a liquid crystal display (LCD).

The selective sync position generator 350 averages horizontal sync positions $\{p_i\}$ of a current field (/frame) stored in the field/frame memory 340 to generate modified horizontal sync positions $\{n_i\}$. The selective sync position generator 350 determines whether to provide the unmodified horizontal sync positions $\{p_i\}$ or the modified horizontal sync positions $\{n_i\}$ to the re-sampler 360. The selective sync position generator 350 selects the modified horizontal sync positions $\{n_i\}$ or the non-modified horizontal sync positions $\{p_i\}$ based on differences between the modified horizontal sync positions $\{n_i\}$, which may depend on the type of system (e.g., VCR, TV, DVD) providing the input analog video signal.

The re-sampler 360 samples the demodulated color signals generated in the Y/C separator and demodulator 320 responsive to the modified horizontal sync positions $\{n_i\}$ or the non-modified horizontal sync positions $\{p_i\}$ provided by the sync position generator 350 and outputs synchronized color signals. The re-sampler 360 may use the current horizontal sync position $p_i$ detected by the sync detector 330. The color signals re-sampled in the re-sampler 350 may be used to generate a display on a display device.

Figure 4:
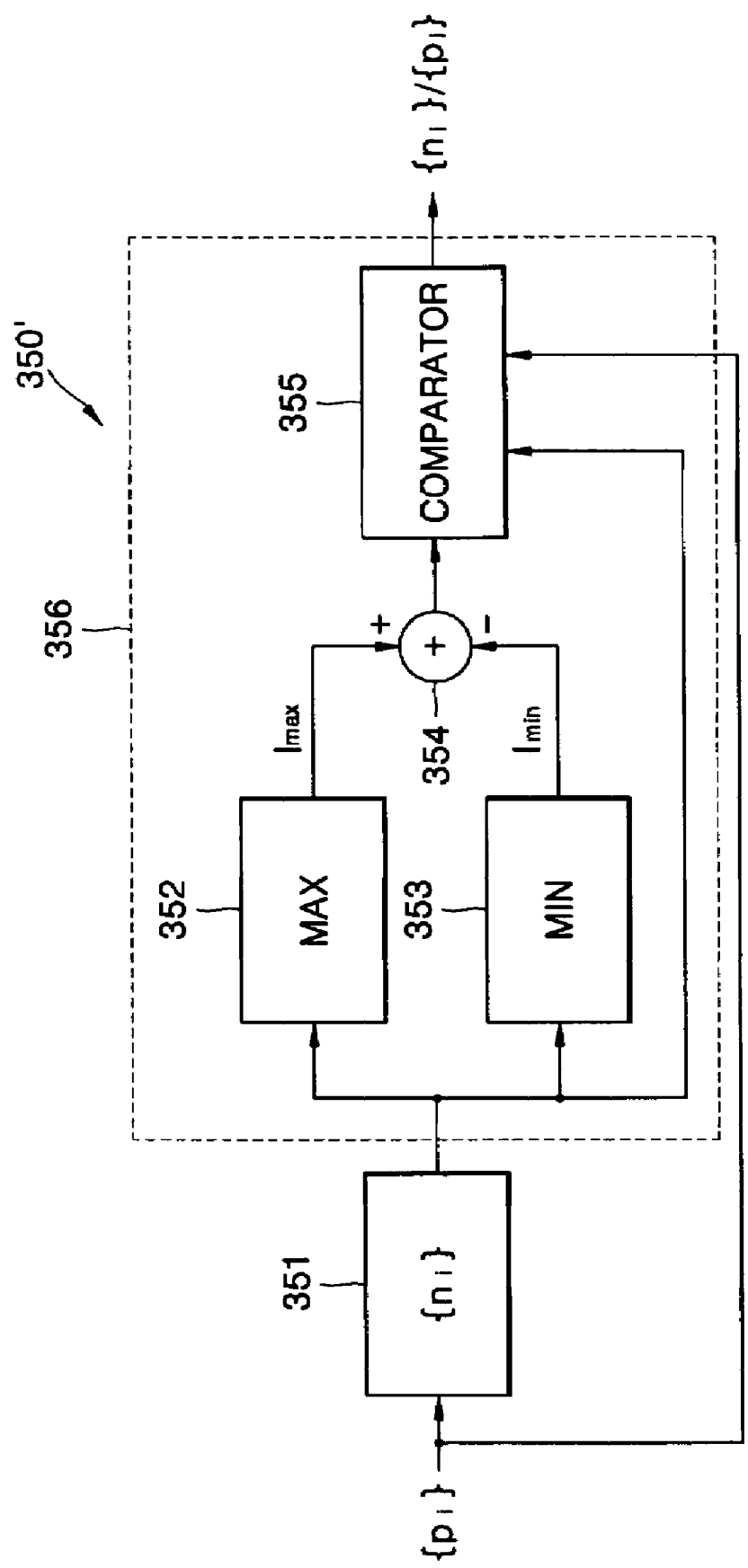
FIG. 4 is a block diagram illustrating a re-sampler that may be used in the apparatus of FIG. 3 according to further embodiments of the present invention.

FIG. 4 is a block diagram illustrating a selective sync position generator 350' which may be used in the apparatus shown in FIG. 3. Referring to FIG. 4, the selective sync position generator 350' includes a sync position determiner 351, and a sync position selector 356 including a maximum length calculator 352, a minimum length calculator 353, a subtractor 354, and a comparator 355. The sync position determiner 351 averages a predetermined number of horizontal sync positions among the horizontal sync positions $\{p_i\}$ of a current field (/frame) stored in the field/frame memory 340 and generates respective modified horizontal sync positions $\{n_i\}$ corresponding to the respective horizontal sync positions $\{p_i\}$.

Figure 5:
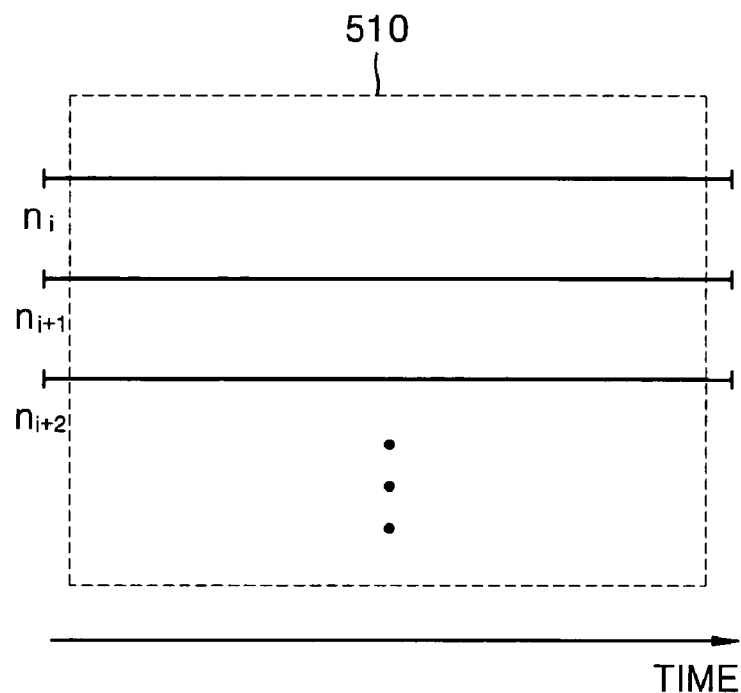
FIG. 5 illustrates rearrangement of horizontal syncs in accordance with some embodiments of the present invention.

The modified horizontal sync positions $\{n_i\}$ may be given by Equation 1, $$n_i = n_{i-1} + \frac{1}{2M+1} \sum_{j=i-M}^{i+M} (p_j - p_{j-1}) \quad (1)$$

wherein i denotes a horizontal sync position index, and $p_j$ denotes 2M+1 input sync positions corresponding to, preceding and following the modified horizontal sync position $n_i$. A modified horizontal sync position $n_i$ is obtained by summing up a previous horizontal sync position $n_{i-1}$ and an average 2M+1 (e.g., 240 in NTSC, 288 in PAL/SECAM) differences $(p_j - p_{j-1})$ between adjacent input horizontal sync positions $p_j$. This may attenuate noise so that the modified horizontal sync positions $\{n_i\}$ modified in the position arranger 351 can be used to generate a stable image on a screen 510, as shown in FIG. 5.

The maximum length calculator 352 calculates a maximum difference $I_{max}$ between neighboring locations of the modified horizontal sync positions $\{n_i\}$ generated by the sync position determiner 351 as given by Equation 2:

$$I_{max} = \max_{i=2, 3, \ldots N} (n_i - n_{i-1}) \quad (2)$$

The minimum length calculator 353 calculates a minimum difference $I_{min}$ between neighboring locations of the modified horizontal sync positions $\{n_i\}$ generated by the sync position determiner 351 as given by Equation 3:

$$I_{min} = \min_{i=2, 3, \ldots N} (n_i - n_{i-1}) \quad (3)$$

The subtractor 354 determines a difference between the minimum difference $I_{min}$ and the maximum difference $I_{max}$. The comparator 355 selects the horizontal sync positions $\{p_i\}$ stored in the field/frame memory 340 or the horizontal sync positions $\{n_i\}$ generated by the sync position determiner 351 based on the difference and outputs the selected horizontal sync positions. If the difference is smaller than a threshold, the comparator 355 selects the modified horizontal sync positions $\{n_i\}$. When the comparator 355 selects the modified horizontal sync positions $\{n_i\}$, the comparator 355 may output a flag signal to the Y/C separator and demodulator 320 to perform the 3D Y/C separation. If the input analog video signal is output from a TV or DVD system, for example, the re-sampler 360 may synchronize and re-sample the demodulated color signals with the modified horizontal sync positions $\{n_i\}$. When a CVBS signal is input from a TV or DVD system, a horizontal synchronizing frequency may have a very small short-term variation, whereas, the horizontal sync positions detected in the sync detector 330 may have an error caused by the noise.

Figure 6A:
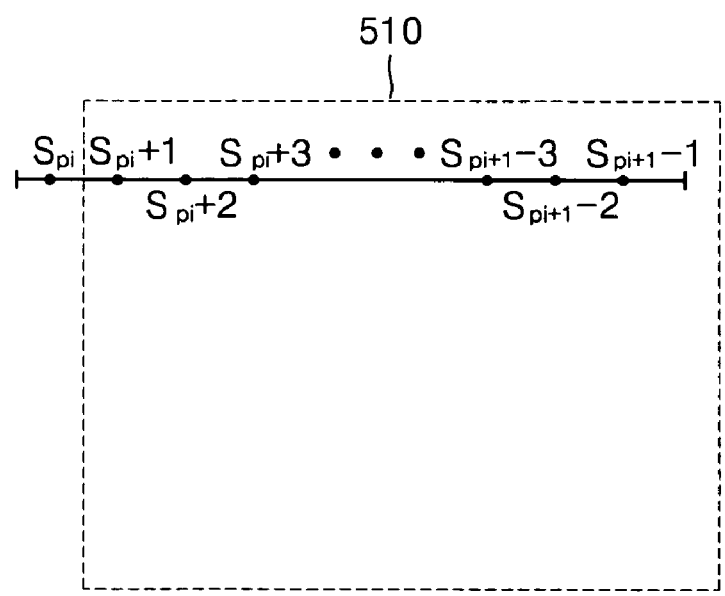
FIGS. 6A and 6B illustrate reorganization of pixel signals responsive to modified horizontal syncs according to further embodiments of the present invention.
Figure 6B:
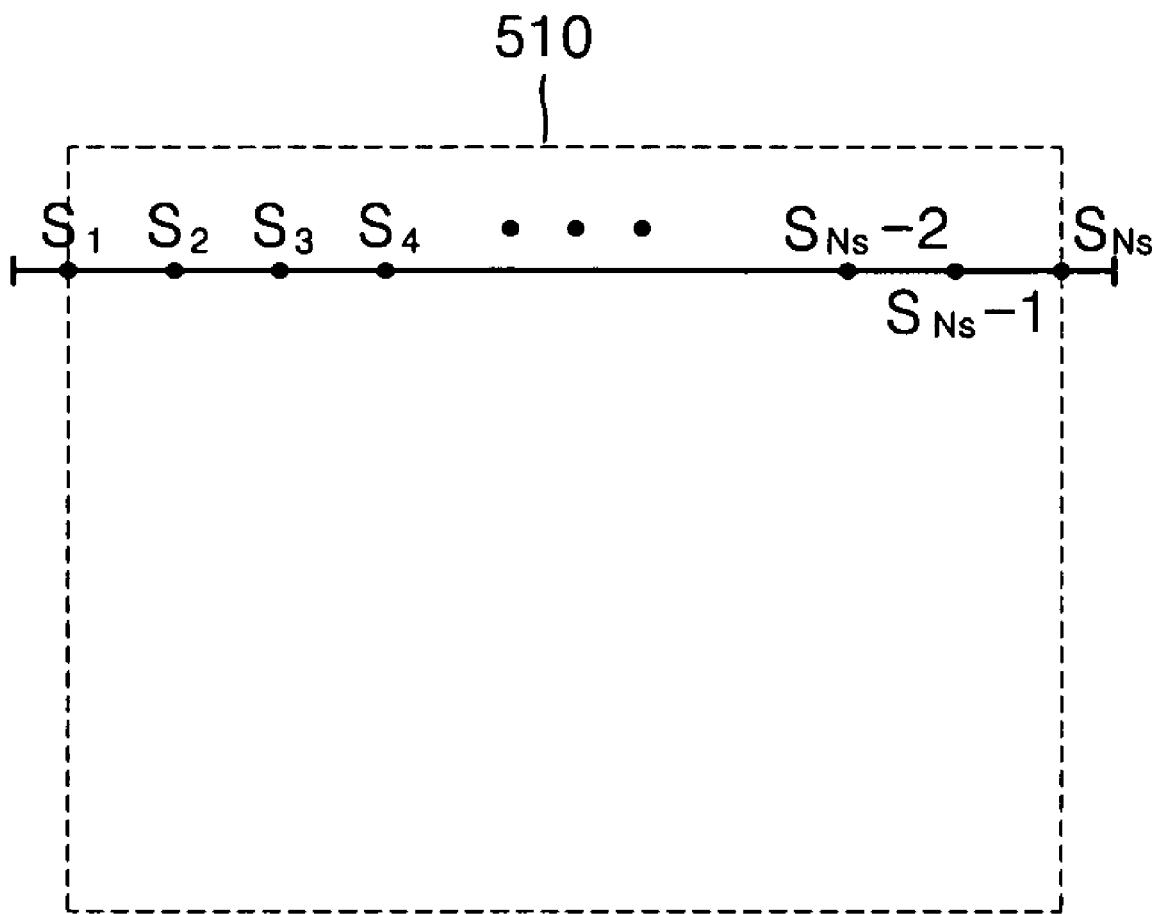

FIGS. 6A and 6B illustrate reorganization of pixel signals according to modified horizontal syncs. A modification of horizontal sync positions may reduce an error generated when re-sampled signals $S_{pi}$, $S_{pi}+1$, $S_{pi}+2$, $S_{pi}+3 \ldots S_{pi+1}-2$, $S_{pi+1}-1$ are scanned at wrong positions of the screen 510, as shown in FIG. 6A. As shown in FIG. 6B, signals $S_1$, $S_2$, $S_3$, $\ldots S_{NS}$ re-sampled according to the modified horizontal sync positions $\{n_i\}$ are scanned at appropriate positions, which can provide a stable image.

Referring again to FIG. 4, if the difference determined by the subtractor 354 is greater than the threshold, the comparator 355 selects the horizontal sync positions $\{p_i\}$ stored in the field/frame memory 340. When the comparator 355 selects the unmodified horizontal sync positions $\{p_i\}$, the comparator 355 may output a flag signal to the Y/C separator and demodulator 320 not to perform the 3D Y/C separation. If the input analog video signal is output from the VCR, for example, the re-sampler 360 may synchronize and re-sample the demodulated color signals using the unmodified horizontal sync positions $\{p_i\}$. When the CVBS signal is input from the VCR, mechanical errors may cause a short-term variation of the horizontal synchronizing frequency. In particular, a specific horizontal sync scanning period may cause an inconsistency in horizontal sync phase differences between fields or frames necessary for the 3D Y/C separation. In this case, the inconsistency may be resolved, and it may not be necessary to modify horizontal sync positions.

In the video signal processing apparatus 300, the selective sync position generator 350 determines characteristics of horizontal sync positions $\{p_i\}$ stored in the field/frame memory 340 and, if the sync positions meet a predetermined criteria, which may correspond to the video signal being from a source, such as a TV or DVD system, outputs modified horizontal sync positions $\{n_i\}$ generated by averaging a predetermined number of input horizontal sync positions. The video signal processing apparatus may reduce horizontal sync error caused by noise, and may thereby provide a stable image. A video decoder having a 3D Y/C separation function can use an embedded field or frame memory without a separate memory upgrade.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus, comprising:
   a sync position determiner configured to receive sync positions and to average the received sync positions to generate modified sync positions; and
   a sync position selector configured to selectively output the received sync positions and the modified sync positions.

2. The apparatus of claim 1, wherein the sync position selector is configured to selectively output the received sync positions and the modified sync positions responsive to differences between the modified sync positions.

3. The apparatus of claim 2, wherein the sync position selector is configured to determine a minimum difference between the modified sync positions and a maximum difference between the modified sync positions and to select from the received sync positions and the modified sync positions based on the minimum and maximum differences.

4. The apparatus of claim 3, wherein the sync position selector is configured to select received horizontal sync positions if a difference between the minimum and maximum differences meets a predetermined criterion, and wherein the sync position selector is configured to select modified horizontal sync positions if the difference between the minimum and maximum differences fails to meet the predetermined criterion.

5. The apparatus of claim 1, wherein the sync position determiner is configured to generate a modified horizontal sync position $n_i$ according to the formula $$n_i = n_{i-1} + \frac{1}{2M+1} \sum_{j=i-M}^{i+M} (p_j - p_{j-1}),$$

wherein i is a horizontal sync position index and $p_j$ are received sync positions corresponding to, preceding and following the modified horizontal sync position $n_i$.

6. A video signal processing apparatus, comprising:
   a sync detector configured to detect sync positions from an input video signal:
   a memory configured to store the detected sync positions for one or more fields:
   a Y/C separator and demodulator configured to perform a Y/C separation and demodulation of the input video signal according to the detected horizontal sync positions to generate a color signal;
   a selective sync position generator configured to receive the detected sync positions from the memory, to process the received sync positions to generate modified horizontal sync positions, and to selectively output the received sync positions and the modified sync positions; and
   a sampler configured to sample and synchronize the color signal according to sync positions output by the selective sync position generator.

7. The apparatus of claim 6, wherein the selective sync position generator is configured to selectively output the received sync positions and the modified sync positions responsive to differences between the modified horizontal sync positions.

8. The video signal processing apparatus of claim 6, wherein the input video signal comprises a digital video signal, and further comprising an A/D converter configured to convert an analog video signal to produce the digital video signal.

9. The video signal processing apparatus of claim 6, wherein the analog video signal is a composite video blank sync (CVBS) signal.

10. The video signal processing apparatus of claim 6, wherein the input video signal comprises a TV output signal, a DVD output signal or a VCR output signal.

11. The video signal processing apparatus of claim 6, wherein the selective sync position generator is configured to provide modified sync positions to the sampler if the input video signal is a TV or DVD output signal, and wherein the selective sync position generator is configured to provide detected sync positions to the sampler if the input video signal is a VCR output signal.

12. A video processing method comprising:
    detecting sync positions from a video signal;
    averaging the detected sync positions to generate modified sync positions: and
    selectively using the detected sync positions and the modified sync positions to sample and synchronize a color signal derived from the video signal.

13. The method of claim 12, wherein selectively using the detected sync positions and the modified sync positions to sample and synchronize a color signal derived from the video signal comprises selectively using the detected sync positions and the modified sync positions to sample and synchronize the color signal responsive to differences between the modified sync positions.

14. The method of claim 13, wherein selectively using the received sync positions and the modified sync positions to sample the color signal responsive to differences between the modified sync positions comprises:
    determining a minimum difference between the modified sync positions and a maximum difference between the modified sync positions; and
    selecting from the detected sync positions and the modified sync positions based on the minimum and maximum differences.

15. The method of claim 14, wherein selecting from the detected sync positions and the modified sync positions based on the minimum and maximum differences comprises selecting a detected sync position if a difference between the minimum and maximum differences meets a predetermined criterion and selecting a modified horizontal sync position if the difference between the minimum and maximum differences fails to meet the predetermined criterion.

16. The method of claim 12, wherein averaging the detected sync positions to generate the modified sync positions comprises generating a modified horizontal sync position $n_i$ according to the formula $$n_i = n_{i-1} + \frac{1}{2M+1} \sum_{j=i-M}^{i+M} (p_j - p_{j-1}),$$

wherein i is a horizontal sync position index and $p_j$ are input sync positions corresponding to, preceding and following the modified horizontal sync position $n_i$.

17. The method of claim 12, further comprising storing the detected sync positions in a memory configured to store detected sync positions for one or more fields and Y/C separating and demodulating the input video signal according to the stored detected horizontal sync positions to generate the color signal, wherein processing the detected sync positions to generate modified sync positions comprises processing the stored sync positions to generate the modified sync positions, and wherein selectively using the detected sync positions and the modified sync positions to sample and synchronize a color signal derived from the video signal comprises sampling and synchronizing the color signal according sync positions selected from the stored detected sync positions and the modified sync positions.

18. The method of claim 17, wherein the input video signal comprises a digital video signal, and further comprising A/D converting an analog video signal to produce the digital video signal.

19. The method of claim 18, wherein the analog video signal is a composite video blank sync (CVBS) signal.

20. The method claim 17, wherein the input video signal comprises a TV output signal, a DVD output signal or a VCR output signal.

21. The method of claim 17, wherein sampling and synchronizing the color signal according sync positions selected from the stored detected sync positions and the modified sync positions comprises sampling and synchronizing the color signal according to modified sync positions if the input video signal is a TV or DVD output signal and sampling and synchronizing the color signal according to detected sync positions if the input video signal is a VCR output signal.

* * * * *